US005720985A

United States Patent [19]

Roche

[11] Patent Number: 5,720,985

[45] Date of Patent: Feb. 24, 1998

[54] APPARATUS FOR THE MANUFACTURE OF SOLID PARTICLES FROM A FLOWABLE MASS

[75] Inventor: Michel Roche, Dijon, France

[73] Assignee: Santrade Ltd., Lucerne, Switzerland

[21] Appl. No.: 581,598

[22] PCT Filed: Apr. 1, 1995

[86] PCT No.: PCT/EP95/01216

§ 371 Date: Mar. 12, 1996

§ 102(e) Date: Mar. 12, 1996

[87] PCT Pub. No.: WO95/30477

PCT Pub. Date: Nov. 16, 1995

[30] Foreign Application Priority Data

May 5, 1994 [DE] Germany .......................... 44 15 846.7

[51] Int. Cl.$^{6}$ .......................... B29B 9/00

[52] U.S. Cl. .......................... 425/8; 264/8; 264/9; 264/13; 425/3; 425/6

[58] Field of Search .......................... 425/6, 8, 3; 264/8, 264/9, 13, 14

[56] References Cited

U.S. PATENT DOCUMENTS

| | | | |
|---|---|---|---|
| 2,968,833 | 1/1961 | De Haven et al. | 264/9 |
| 3,070,837 | 1/1963 | Loertscher et al. | 425/6 |
| 3,325,858 | 6/1967 | Ogden et al. | 425/6 |
| 3,617,587 | 11/1971 | Nayar et al. | 264/8 |
| 4,063,856 | 12/1977 | Dziedzic | 425/8 |
| 5,154,220 | 10/1992 | Crawford | 425/6 |
| 5,259,593 | 11/1993 | Orme et al. | 425/6 |
| 5,500,162 | 3/1996 | Theisen et al. | 425/6 |

FOREIGN PATENT DOCUMENTS

| | | |
|---|---|---|
| 0 152 285 | 8/1985 | European Pat. Off. . |
| 0 233 384 | 5/1987 | European Pat. Off. . |
| 675 370 | 9/1990 | Switzerland . |
| 1 503 504 | 3/1978 | United Kingdom . |

*Primary Examiner*—Jay H. Woo
*Assistant Examiner*—Joseph Leyson
*Attorney, Agent, or Firm*—Burns, Doane, Swecker & Mathis, L.L.P.

[57] ABSTRACT

In order to form separate particles from a flowable mass, the flowable mass is fed through a pipe and extruded through holes formed along a longitudinal axis thereof. The pipe is oscillated by an agitator in a direction transversely of the longitudinal axis to cause the extruded mass to be sheared-off in the form of particles. Stop members can be positioned adjacent respective sides of the pipes to be contacted by the pipe and thereby define change-of-direction points for the pipe during its oscillation. The agitator may include piezo-electric ceramics attached to the stop members.

12 Claims, 4 Drawing Sheets

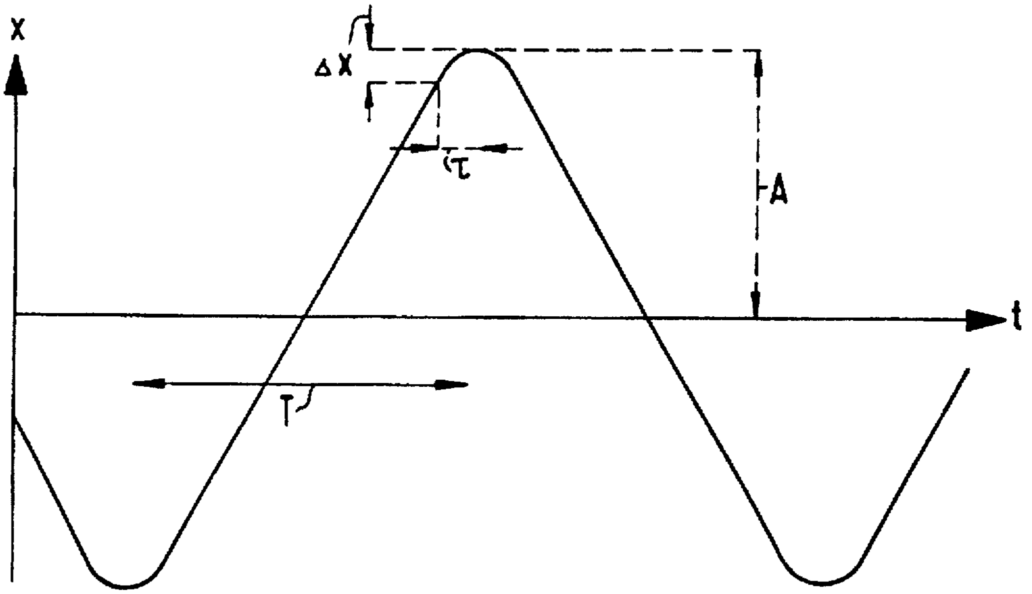
FIG.6
FIG.7
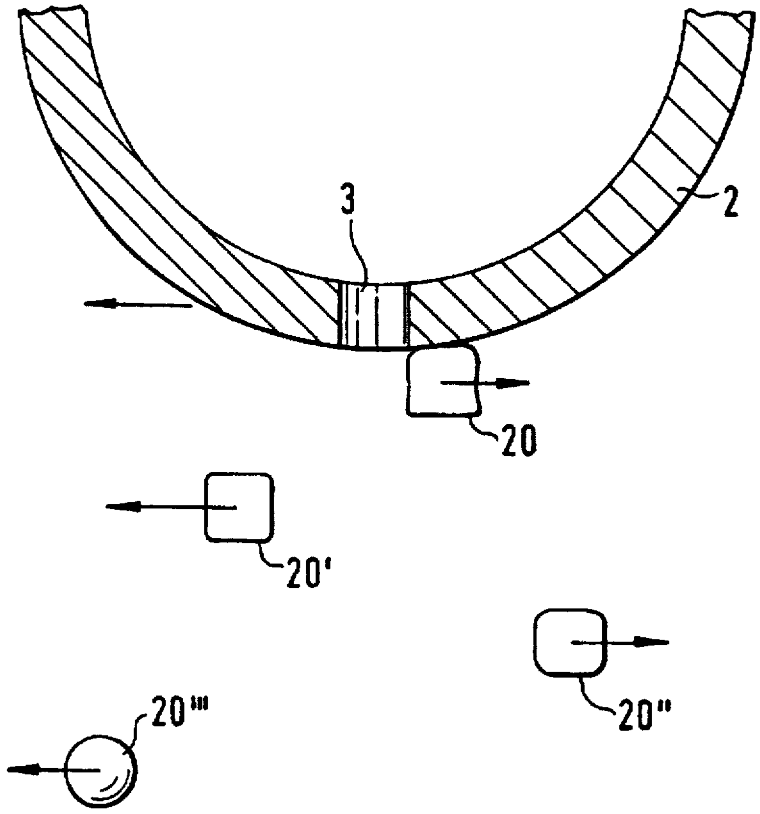

APPARATUS FOR THE MANUFACTURE OF SOLID PARTICLES FROM A FLOWABLE MASS

BACKGROUND OF THE INVENTION

The invention pertains to an apparatus for the manufacture of monodisperse tablets or spheres using a rigid frame, a tubular extruder arranged in it with outflow openings for the mass to be tableted and with an installation for production of periodic inertial forces effecting a shearing of the extruded mass streams.

Installations exist which produce droplets according to the principle mentioned above. These installations work in part with a randomness associated with hydrodynamics and a stream separation principle which does not facilitate exact control of the shearing moment nor, as a result, the dimensioning of the separated droplets.

From Swiss Patent 675370, a process and apparatus for the mass production of small, essentially spherical one or more-layered particles is known. In this known design, a nozzle head with many concentrically arranged nozzles is provided from which a central mass, a mass forming further layerings as well as a shell mass are fed. The streams exiting from the concentric nozzles are subjected to oscillations by a vibrator which lead to a periodic acceleration and delay of the exiting streams which then leads to a shearing into individual particles if the outer streams maintain a higher velocity. These particles are conveyed from the shell stream to a buffer medium which results in solidification of the particles and acts simultaneously to convey the solid parts outward.

Apparatuses of this design presume an exact control and dimensioning of the various mass streams. Minimal deviations in the stream relationships lead to non-monodisperse particles. The separation of the particles also depends on the adjusted flow relationships.

In contrast, the objective of the present invention is to provide an apparatus of the above mentioned type such that the separation of a stream results regardless of difficult flow relationships and indeed such that the moment of the separation can be determined in a relatively simple way.

SUMMARY OF THE INVENTION

It is suggested, to meet this objective in an apparatus of the above mentioned type, that the tubular extruder comprises a movable pipe held in the Same with holes arranged parallel to its axis, and that at least one agitator be provided as the equipment for production of the periodic inertial forces with which the pipe is periodically excited perpendicular to its axis, i.e. perpendicular to the stream direction of the mass, with a parallel shift. The pipe can also be excited to a periodic rotational movement within a small angle about an axis outside the pipe and parallel to a generatrix of the pipe.

The recognition that hydrodynamic flow with as little turbulence as possible is preferred over a flow which can be the site of eddies and segregation factors is the basis for this arrangement. The chosen form of the extruder head is then not immaterial and it has been shown that a laminar flow and a rapid circulation of the mass in the extruder head can be ensured with the invention. On (his basis, the apparatus according to the invention allows the mass within a pipe to circulate in rectilinear fashion at least at the level of the extruder nozzles. Further, it offers the advantage of simpler design, manufacture, installation and service. The nozzles are arranged lengthwise, i.e. along a generatrix of the pipe.

Three types of motion can be provided:

Displacement

Displacement perpendicular to an axis of rotation

Rotation about the axis of rotation.

The first is not favorable from the standpoint of productivity, since the parabolic axis of dispersion intersects with those of the openings, and the hazard can then arise that the streams oppositely influence one another, if the nozzles do not have enough separation. The second is interesting since the parabolic axis runs vertically with respect to the axis of the openings, whereby the streams can never influence one another oppositely and many more openings can be provided per unit of length. The last is likewise satisfactory for the same reason. It poses problems insofar as the operating speed of the pipe (during rotation) bestows no total motion to the fluid as in a displacement, but effects a shearing of the fluid which can lead to extrusion errors.

In a further development of the invention, a periodic parallel displacement perpendicular to the axis of the tube takes place during motion of the tube, i.e. perpendicular to the circulation axis of the mass. Also, a periodic rotation at a weak angle about an axis parallel to a generatrix of the tube exterior to it is considered. Otherwise this motion would be created by an alternating sequence between phases with quasi-constant velocity and phases with rapid change of displacement direction.

According to another feature, the agitators alone facilitate both the displacement of the pipe with quasi-constant velocity and the changing of its displacement direction.

According to another feature the apparatus is equipped on each side of the pipe with one or more back-stops, preferably of metal, which are solidly connected to the frame and against which the pipe impacts once per period so that it can reverse its direction of displacement very quickly; further, the agitators of the pipe act as compensation of the diverse energy loss which is experienced by the pipe during its ballistic displacement between the two back-stops, or series of back-stops, as for example the loss by air and bearing friction or the loss at impact against the back-stops.

According to another feature, the apparatuses with which the pipe is held in motion, act only during the ballistic displacement phase of the pipe between the two back-stops or series of back-stops, wherein these apparatuses act directly on the pipe.

In a further development of the invention, the apparatuses with which the pipe is held in motion act only during contact of the pipe with a back-stop; they act, therefore, not directly on the pipe, but rather on the back-stops, whereby they change the position, velocity, or elasticity of the back-stops.

According to another feature, the apparatuses consist of a moving coil in a magnetic circuit polarized by a permanent magnet for maintenance of the motion. The magnetic circuit is connected to the pipe by a bail connection and to the frame solidly, in addition a suitable electronic circuit to energize this moving coil and a position sensor for determination of the position of the pipe are provided, as needed.

According to another feature, the pipe is joined to the moving plates of a variable dielectric capacitor whose fixed plate is rigidly connected to the frame, wherein the entirety constitutes the apparatus for maintaining the motion; in addition, a suitable electronic circuit is provided, with which the capacity of the condenser and thus the intensity of the force exerted on the moving plates by the fixed plates can be varied. A position sensor for determination of the position of the pipe is provided as well, if necessary.

The apparatuses with which the pipe is held in motion, consist of one or more piezoelectric ceramics in two-element crystalline arrangement, wherein one end is engaged in the frame and the other in the pipe and which bestow a force to the pipe tangential to the rotation of the pipe about its axis of rotation; in addition, electronic controls for the piezoelectric ceramics and one or more position sensors, as necessary, for determination of the position of the pipe, are provided.

According to another feature, the pipe only oscillates between two back-stops, one on one side of the pipe and the other on the other side, and the piezoelectric ceramics are all simultaneously controlled.

According to another feature, the pipe only oscillates between two back-stops, one on one side of the pipe and the other on the other side, and the piezoelectric ceramics are all individually controlled so that by effecting the phase and intensity of the force exerted by each piezoelectric ceramic on that part of the pipe in which it is engaged, the deflection of the pipe can be corrected; further, a position sensor is provided per piezoelectric ceramic, as needed.

The pipe can also oscillate between two series of back-stops, one on one side of the pipe and the other on the other side, both with the same number of back-stops and advantageously arranged such that for any back-stop on one side of the pipe, a back-stop on the other side of the pipe is assigned to it symmetric with respect to the axis of the pipe; one piezoelectric ceramic exists per back-stop pair, and all are individually controlled, so that by effecting the phase and intensity of the force exerted by each piezoelectric ceramic on the section of the pipe in which it is engaged, the deflection of the pipe can be corrected; in addition one position sensor per piezoelectric ceramic is provided, as needed.

The pipe only oscillates between the two back-stops, one on one side of the pipe and the other on the other side, each rigidly connected to a piezoelectric ceramic, which operates in the same way as the metal back-stops in deflection, preferably affixed to the surface of the back-stop across from the surface which the pipe impacts; in addition, electronic controls for the two piezoelectric ceramics are provided.

In a variation, the pipe oscillates between two series of back-stops, one on one side of the pipe and the other on the other side, both with the same number of back-stops and arranged such that for any back-stop on one side of the pipe, a back-stop on the other side of the pipe symmetrically corresponds with respect to the axis of the pipe, and each is rigidly connected to a piezoelectric ceramic which operate in the same way as the metal back-stops in the deflection, preferably affixed to the surface of the back-stop across from the surface which the pipe impacts. All of these piezoelectric ceramics are individually controlled so that by effecting the phase and intensity of the force exerted by each ceramic on its back-stop, the rigidity of the back-stop is controlled and thus the deflection of the pipe can be corrected.

BRIEF DESCRIPTION OF THE DRAWINGS

Further features and advantages of the invention are more clear in the following description of examples of embodiments of the invention, which are represented in the illustrations. Shown are:

FIG. 6 is a graph depicting the travel distance of the nozzle position as a function of time, and FIG. 7 is a fragmentary cross section through a pipe showing the separation of a "droplet" as well as the track and the sphere formation of the just-extruded "droplet".

DETAILED DESCRIPTION OF PREFERRED EMBODIMENTS OF THE INVENTION

Figure 1:
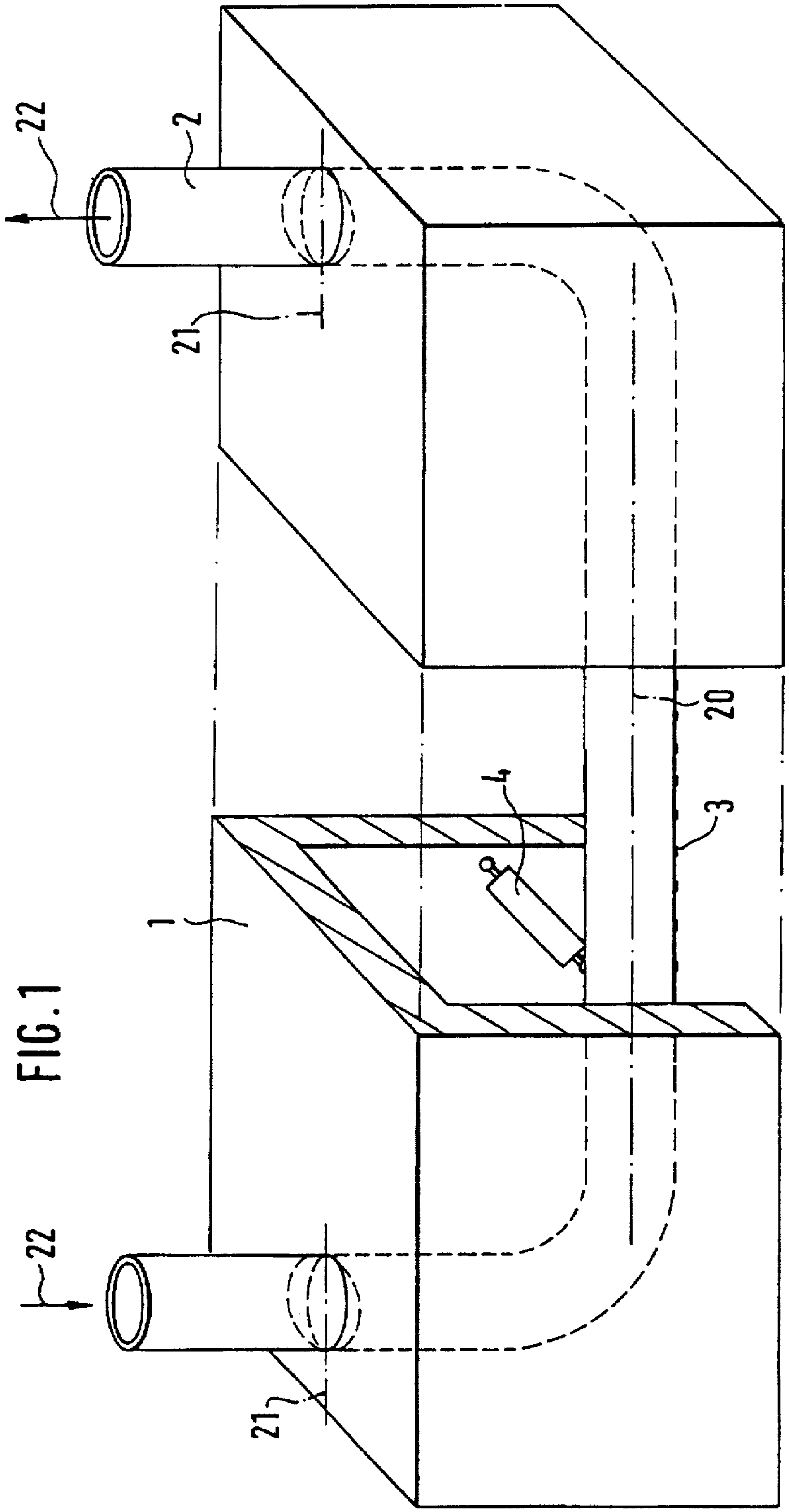
FIG. 1 is a perspective, broken away view of an apparatus according to one embodiment of the invention which is provided with a pipe.

In FIG. 1, an apparatus according to the invention is schematically represented, which consists of a rigid flame in the form of a rectangular hood open to the bottom and of a pipe (2) bent approximately in the form of a U. Two legs or shanks (*2a*) of the pipe protrude through a closed end of the frame (1) such that the pipe can be moved in a direction D perpendicular to a longitudinal axis (20A) of a bight portion (*2b*) of the pipe (2) which interconnects the shanks (*2a*). Pendulum mounting (*2c*) can be provided for the shanks (*2a*) whereby the imaginary pendulum axes (21) run parallel to the axis (20A). It is not absolutely necessary to provide a pendulum mount, for example by hanging elastically at the height of the axis (21). Rather, the individual elasticity of the pipe (2) itself can provide the necessary motion in the direction D perpendicular to the axis (20A) for droplet formation. The prerequisite is that the imaginary axis (21) is sufficiently far from the longitudinal axis (20A) of the pipe (2).

Figure 2:
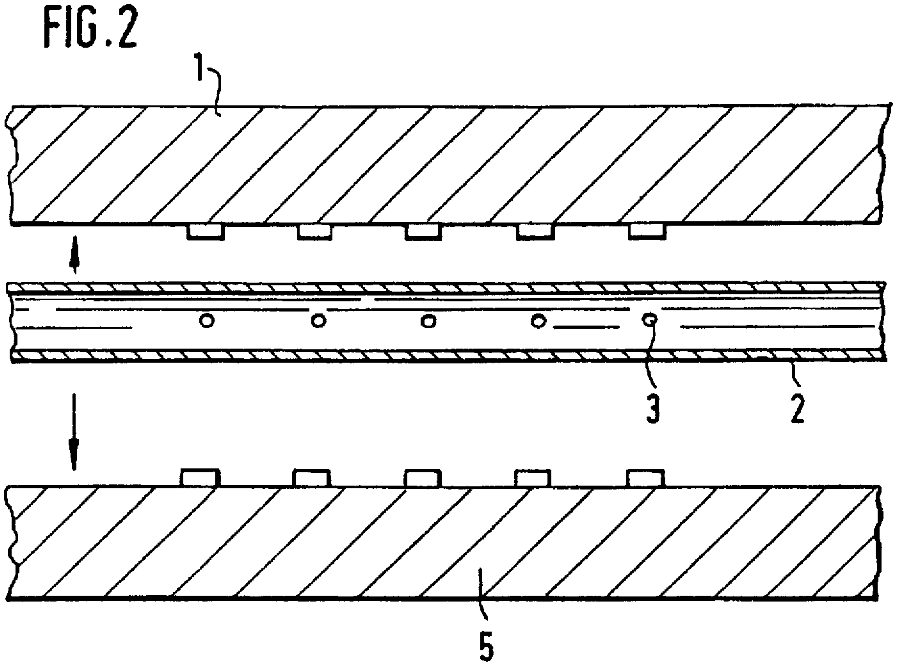
FIG. 2 is a longitudinal sectional view through the pipe of FIG. 1.
Figure 3:
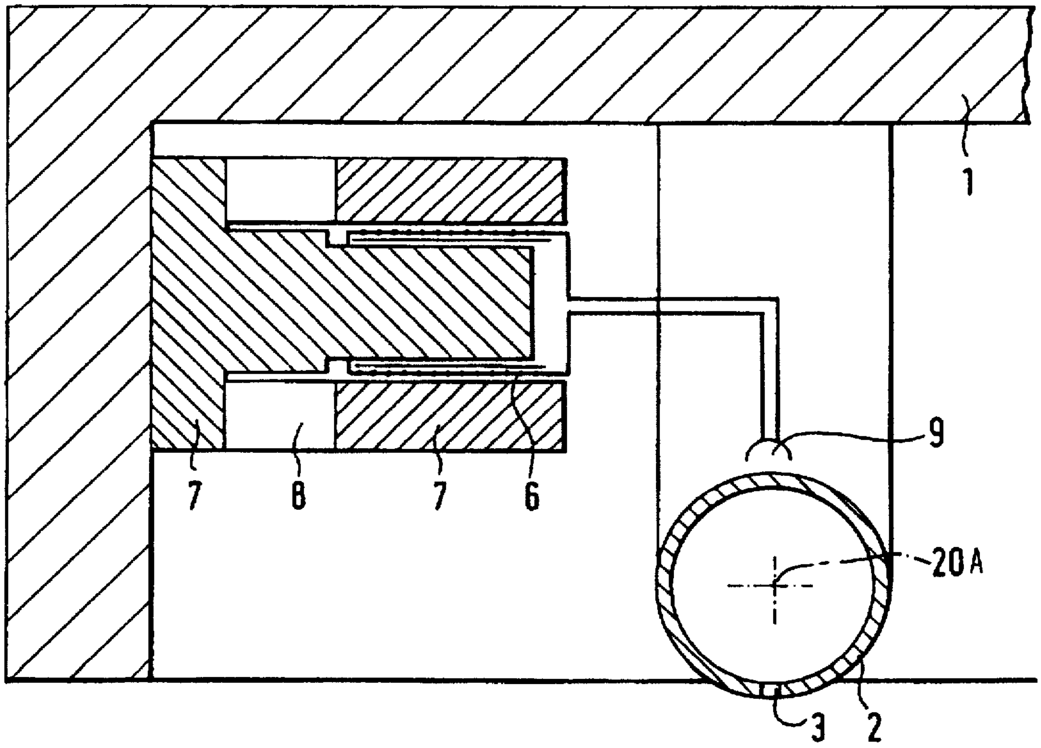
FIG. 3 is a cross-sectional view through the pipe agitator of FIG. 1 whereby a moving coil, a magnetic circuit, a permanent magnet and a ball connection between the coil and the pipe are provided to oscillate the pipe.
Figure 4:
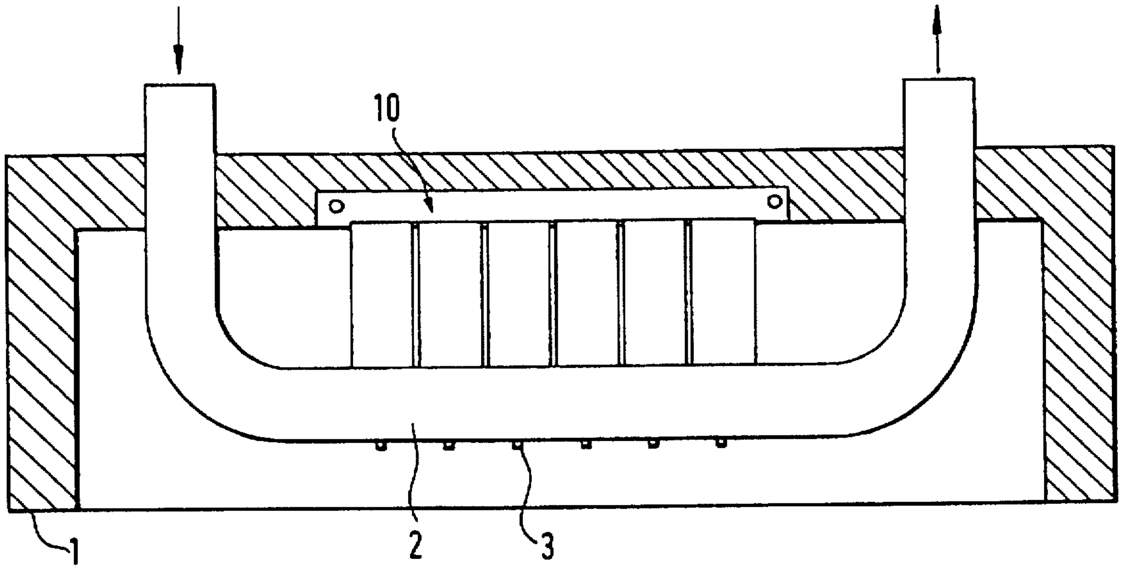
FIG. 4 is a longitudinal section through a second embodiment in which the pipe impacts against stop members and the pipe motion is maintained "in flight" by the piezoelectric ceramics (two-element crystal)

The bight (*2b*) of the pipe (2) is, as can be seen particularly in FIGS. 2 and 3, provided with several drilled holes (3) facing the open section of the frame (1). These are arranged in a row one after the other parallel to the axis (20A). With the help of an agitator (4), in the previous case a vibration system, transverse accelerations can be transferred to the pipe which, as is yet to be pointed out, can be used for droplet formation.

It could also be possible to construct the pipe (2) not U-shaped, but rather as a straight pipe and then to guide it in one or more tracks which run perpendicular to its axis (20A). A vibration system similar to the agitator (4) could then also be used. In the depicted embodiment, a rotation about axis (21) is provided, as already shown, for cross-displacement of the pipe perpendicular to axis (20A). Since the distance between the axes (21) and (20A) is chosen large enough, the solution shown in FIG. 1 at small rotating angles approaches, for all practical purposes, a pure parallel displacement of the pipe (2).

The mass to be dispersed is fed through the pipe (2) in the direction of the arrows (22) and such that the flow at the drill holes (3) is as equally distributed as possible.

The shearing of the extruded mass results from vigorous agitation of the pipe (2), acting as the extruder head, by the vibration system (4), through which transverse accelerations are conveyed to the drill holes (3) acting as extrusion nozzles. As seen in FIG. 7, the separated "droplets" are sheared from the holes (3) and alternatingly sent in two opposing directions D', D", since the velocity of the pipe (2) and thus the nozzles (3) periodically changes, whereby their recoalescence is prevented. The "droplets" (20) at first still have the form of the just-sheared strand, and then assume the form of a droplet in the actual sense in free-flight (see 20', 20'', and 20'''). These droplets (20''') can be solidified in any desired fashion. This can occur, for example, by free fall in a cooling tower, or by collection in a fluid-filled cooling tank, or also by deposition on a cooling belt.

It is easy to understand that to control the volume of the "droplet" extruded at each acceleration, it is necessary to exert control of the extrusion duration between two accelerations the acceleration moment and the duration of the deceleration/acceleration phase In particular, the split surface between two consecutive pieces or "droplets" is more clearly defined the quicker the velocity is reversed, thus the necessity of a large acceleration, i.e. large forces. A good split surface definition leads to a good reproducibility of the length of the "droplet" and thus of the volume of the extruded mass.

On the other hand, it is important that the "droplet" is not disturbed during the extrusion by changes in velocity of the pipe (2), excluding of course the reduction in velocity necessary for the pipe to change its direction of movement which makes the shear-off from the strand possible. The extrusion of the strand through the nozzles (3) is produced by pressure forces within the pipe (2) which can be assumed to be constant. If the pipe (2) does not move with constant velocity at the moment of extrusion, the "droplet" is deformed during the extrusion, whereby its coalescence is disturbed and it can eventually shear off prematurely.

It is understandable, then, finally, that a quality production—i.e. production of monodisperse, equally large droplets,—follows from the maintenance of the following two requirements:

As vigorous an acceleration as possible at the moment of shear,

An extrusion phase with as constant a velocity as possible (pipe in "ballistic flight".

The ideal displacement of the pipe (as a function of time) results in sawtooth fashion and in practice by an alternating series between displacements with quasi-constant velocity (the position is linearly dependent upon time) and extremely abrupt changes of displacement direction (the position is sinusoidally dependent on time), as seen in FIG. 6.

In the first embodiment, the pipe (2) FIG. 1 with the holes (3) is controlled to constancy, i.e. the motion has no phases in which the displacement of the pipe would be subject to inertial forces alone. Likewise, the change of direction of motion is caused by the agitator itself (4) which very quickly reverses the direction of its force. This principle has two significant disadvantages:

A very vigorous change in the pipe displacement requires very strong, i.e. voluminous agitation systems (4), which result in large energy costs and add too much heat to the system, while the temperature of the mass generally must be carefully controlled—not only so that it does not solidify, but also so that the substances which it contains are not destroyed by the temperature (this is the case especially with pharmaceuticals, if the active components are contained in a binder, i.e. the mass).

The agitation system (4) is continuously running: it not only runs during the entire working cycle, but also does not allow the kinetic energy of the pipe (2) to be recovered at the moment of its deceleration, for use in its retro-acceleration.

For these reasons, an embodiment is preferred in which the change in the direction of motion is brought about by impact against one or more mechanical back-stops (5) rigidly connected to the massive frame (1). During the impaction, the kinetic energy of the pipe (2) is transformed into elastic deformation energy of the back-stop (5) and then given back to the pipe (3) at the moment of release of tension. The agitators (4) of the pipe (2) thus no longer act to change the direction of displacement of the pipe, but simply for maintenance of its motion, which consists of compensating for the loss through air and beating friction and the losses through "non-elasticity" of the material against the back-stops (5). It is then easy to understand that the performance of the agitator does not need to be as great as before.

The required energy for maintenance of the motion can either be supplied during the "flight" of the pipe (2) travelling back and forth between its two back-stops (5) like a pendulum, or at the moment of impact itself. In any case, the energy can be introduced to the system either twice per period, only once, or also once for all periods.

In the first case, the choices are:

classical electrodynamic systems with motive coils (6) in a magnetic circuit (7) polarized by a permanent magnet (8), similar to loud-speaker motors and connected to the pipe (2) by a ball correction (9), capacitative systems, whose extrusion element is connected to the moving plate of a rotating-plate condenser, piezoelectric systems with two-element crystals (10), which facilitate large displacements.

Figure 5:
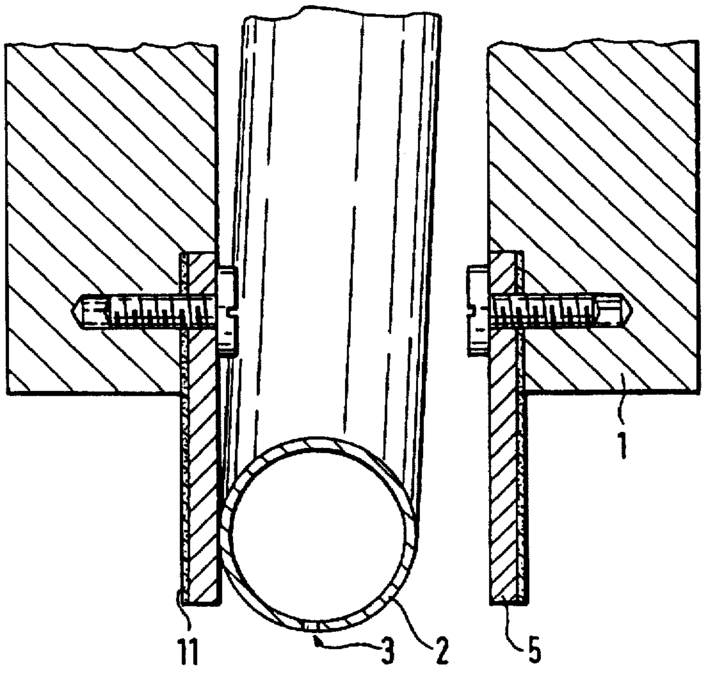
FIG. 5 is a cross section through the apparatus of FIG. 4, wherein the pipe motion is maintained by piezoelectric ceramics at the moment of impact.

In the second case, the energy required for maintenance of the motion is supplied at the moment of impact against the back-stop (5), in which the latter is mounted to a "drive". In practice, as shown in FIG. 5, the easiest incorporated "drive" in this sense is a piezoelectric ceramic strip (11) affixed to the back-stop which directly in contact with the pipe (2) or, between the back-stop (5) and the massive frame (1). The pipe (2) is then no longer subjected to inertial forces alone between the two impacts against the back-stops (5), which lends excellent geometry to the "droplets" during extrusion.

Yield stresses are tested, which arise in the apparatus through hydrodynamics (non-segregation of the mass) and by the monodisperse character which the production must exhibit (rapid change of direction). The systems described above are still not entirely satisfactory with respect to the regularity of their production. This is because the pipe (2) was considered a completely rigid element up to this point, while it is certainly subject to deformation. The problem arises when the multi-nozzled device is extrapolated on the basis of a device with a single-nozzled pipe.

It is necessary, based on productivity, to drill the largest number of nozzles (3) in the pipe (2) as possible, preferably along a generatrix. In the embodiment—in which the pipe oscillates between two back-stops (5) on opposite sides of the pipe (2)—the compression wave created by the impact extends along the entire length of pipe (2) from the point of contact between the back-stops (5) and the pipe (2), which effects a deflection of the latter and eventually the excitation of vibrational deflection modes. The nozzles (3) then do not all have the same motion, regardless of whether they are equally distributed along the pipe (2), and it is then impossible to achieve uniform production.

The pipe (2) may thus not be viewed as a rigid, un-deformable element. The correction of its deformations should result from the motion maintenance system (4) itself, which no longer exerts point forces, but rather forces which are distributed along the pipe (2) and dosed according to the development of the deflection line (either measured by an independent sensor or, if possible, by the apparatus (4) itself). This adjustment is accomplished in real-time through the control electronics of the drive (4). If a deflection mode arises, the energy which is introduced by the drive (4) to the "leading" section of the pipe (2) is lessened, while it is increased for the "trailing section" of the pipe (2). In this way, the pipe (2) maintains a completely rigid behavior and all nozzles (3) behave the same with respect to their motion. They thus have a collective behavior, whereas the individual control of each individual nozzle (3) would be ideal.

In an advantageous development, the pipe (2) is held in motion by a row of piezoelectric ceramics (10) in two-element crystalline design, wherein one end of each of the ceramics (10) is engaged in the massive frame (1) and the other is engaged with the pipe (2) according to a generatrix. The energy lost at each half-cycle is directed to the system by this row of ceramics.

In another embodiment, the single back-stop is replaced with a large number of back-stops (5) on each side of the pipe (2)—for example one per nozzle (3)—in order to best distribute the impact along the pipe (2); further, a ridge of drives is provided, preferably of piezoelectric ceramics (10).

This improvement can also be undertaken in the system for maintenance of the motion at the moment of impact: the pipe (2) oscillates between two series of back-stops (5) (in equal number and arranged symmetric to the pipe)—for example steel strips—upon which piezoelectric ceramics (11) are affixed; the entirety is engaged in the massive frame (1). The measurement of the deflection line of the pipe (2) can easily be accomplished by the ceramic itself (11). The control electronics then control each ceramic individually, which means that the rigidity of each steel strip (5) is regulated: those on which the pipe (2) is "leading" become weaker, while those on which the pipe (2) is "bailing" become stronger.

The apparatus can, for example, be employed in the pharmaceutical industry (medicines in granular form), in the chemical industry (chemicals in tablet form, cleaning products in granular form) or for the natural resources industry.

As an example, a steel strip (5) with a piezoelectric ceramic (11) in the case of the use of a stainless steel pipe (2) of any length is provided with 1 nozzle (3) per cm. Thus, steel strips (5) and piezoelectric ceramics (11) with 1 cm breadth are chosen:

In FIG. 6, the travel of a nozzle (3) is tracked over time. It consists of a series of "ballistic flight" phases with constant velocity, separated by sudden sinusoidal changes of direction. The goal is to reduce the duration of these directional reversals as much as possible. Further, it is noted: T=time period and x=the travel distance of pipe (2) covered during $mx^{-1}$ of its deceleration phase (where m equals mass of the pipe).

At the moment of the "impact", all the kinetic energy $E_C$ of the pendulum (2) is transferred to the steel strip (5) and simultaneously to the piezoelectric ceramic (11) in elastic deformation energy.

The steel strip (5) and the piezoelectric ceramic (11) form the element with the highest stress, and the dielectric breakdown range between the two electrodes may not be exceeded nor the elasticity boundary of the outer strand. These two requirements are manifested in the form of a characteristic maximum energy densities $E_P$ of the material. They vary from 200 J/m$^3$ to over 3,000 J/m$^3$.

The energy stored by the strips (5) and which can be given back off at the moment of return travel of the pipe (2) is dependent on the ceramic volume V (Vlbe) and on the volume equivalent of the useful mass:

$$V_{eq}=m/p$$

m=mass of the pendulum per length (2)

p=density of the piezoelectric ceramic (11).

This energy amounts to:

$$2E_1=\frac{V\cdot E_p}{1+\frac{1V}{5V_{eq}}}$$

The coefficient 1/5 reflects that a ball connection is at work in the connection between strip-type back-stop (5) and pipe (2) at the moment of impact.

The steel strip (5) must for its part absorb the kinetic energy residual $E_2$ not absorbed by the ceramic (11):

$$E_2=E_C-E_1$$

This kinetic energy amounts to $E_C=(1/2)mv^2$, where v is the velocity of the pipe (2) during its ballistic phase. This velocity amounts to:

$$v=\frac{A-2\cdot\Delta x}{T/2-2\cdot\tau}$$

$\Delta x$ and $\tau$ are to be evaluated. The fundamental equation of the dynamics applied to the pipe (2) in the deceleration phase yields, if the braking force of the piezoelectric ceramic (11) is neglected in comparison with that of the steel strip (5):

$$m\frac{d^2x}{dt^2}=-k\cdot x.$$

When integrated with the initial conditions x=0 at t=0, and dx/dt=v at t=0, the well-known periodic pulsation motion $\omega=\sqrt{k/m}$ and amplitude motion $$v\sqrt{\frac{m}{k}}$$

are obtained:

$$x=\left(v\sqrt{\frac{m}{k}}\right)\cdot\sin\left(\sqrt{\frac{k}{m}}\,t\right).$$

Thus the relationship between $\Delta x$ and $\tau$:

$$\Delta x=\left(v\sqrt{\frac{m}{k}}\right)\cdot\sin\left(\sqrt{\frac{k}{m}}\,\tau\right)\approx v\tau.$$

Continuing, the formula for the expression of the velocity is reduced to:

$$v=\frac{A-2\cdot\Delta x}{T/2-2\cdot\tau}\approx\frac{2A}{T}$$

the kinetic energy finally amounts to:

$$E_c=2m\left(\frac{A}{T}\right)^2$$

It must be kept in mind that the strip (5) behaves like a spring with stiffness k. Its elastic deformation energy is then given by:

$$E_2 = \int_0^{\Delta x} kx \cdot dx = \frac{1}{2} k(\Delta x)^2$$

If the approximation $\Delta x = v\tau = (2A\tau)/(T)$ is used as above, the following is obtained:

$$E_2 = \frac{1}{2} k \cdot \left( \frac{2A\tau}{T} \right)^2$$

thus k:

$$k = \frac{2 \cdot E_2}{\left( \frac{2A\tau}{T} \right)}.$$

The energy balance yields: $E_2 = E_C - E_1$. Since $E_C$ and $E_1$ were calculated above, it is easy to derive $E_2$ and finally the stiffness k of the steel strip (5), thus its fine-tuned dimensions by means of the expression of the stiffness of an embedded strip, which acts with deflection:

$$k = \frac{3EI}{L^3}$$

here, $$I = \frac{b \cdot h^3}{12}$$

is the inertial moment of the section of the strip (5) referred to the axis against which the width b is measured, and h is its thickness.

Thus h is:

$$h = \sqrt[3]{\frac{4k}{Eb}}.$$

If we carry out the following numerical application:

| | |
|---|---|
| Piezoelectric ceramic (11): | L = 4 cm |
| | b = 1 cm |
| | e = 1 mm |
| | p = 7.15 kg/cm$^3$ |
| | $E_p$ = 3.116 mJ/cm$^3$ |
| Steel strip (5) | L = 4 cm |
| | b = 1 cm |
| | E = 200,000 N/mm$^2$ |
| Motion: | T = 1 ms |
| | A = 1 mm |
| | /T = 0.1 |
| Pipe (2) | Inner diameter: 14 mm |
| | Wall thickness: 0.5 mm |
| One obtains: | m = 3.43 g per cm of pipe |
| | $V_{eq}$ = 0.48 cm$^3$ |
| | V = 0.4 cm$^3$ |
| thus | $E_1$ = 0.53 mJ |
| however | $E_C$ = 6.86 mJ |
| thus | $E_2$ = 6.33 mJ |
| and finally | k = 3.17 × 10$^5$ N/m |
| thus the thickness of the steel strip: | h = 3.40 mm |

These dimensions are completely compatible with the other stresses (general dimensions of the vibrator, hydrodynamics, productivity, costs). It is notable that, in the embodiment example, the proportion of the steel strip (5) to the piezoelectric ceramic (11) in the absorption of kinetic energy from the pipe (2) exists in the ratio of 12/1:92.3% is absorbed by the steel strip (5) and 7.7% by the ceramic (11).

It is clear that the more exacting the ratio τ/T, the more rigid the back-stop (5) must be: k varies with the square of τ/T. Since all other parameters remain constant, a thickness h of 16 mm is reached, if for example a sectioning duration of the strand is assumed to be 100 times shorter than the extrusion duration.

We claim:

1. An apparatus for producing particles from a flowable mass, comprising:
   - a frame;
   - an extrusion pipe mounted in the frame for conducting the flowable mass and including outlet holes spaced along a longitudinal axis of the pipe for discharging the flowable mass in a discharge direction extending transversely of the pipe axis, the pipe mounted to swing about an axis of rotation extending parallel to the pipe axis in spaced relationship thereto;
   - an agitator operably connected to the pipe for oscillating the pipe about the axis of rotation in a direction transversely of the discharge direction for shearing off the mass flowing through the outlet holes so that the sheared-off mass forms particles; and
   - a stop structure arranged to be impacted by the pipe in both directions of movement of the pipe during its oscillation.

2. An apparatus according to claim 1, wherein the agitator is operable to produce a pipe motion which constitutes a series which alternates between phases with quasi-constant velocity and phases with rapidly changing direction of motion.

3. The apparatus according to claim 1, wherein the agitator constitutes a sole means of changing a direction of movement of the pipe to produce the oscillation thereof.

4. The apparatus according to claim 1, wherein the agitator is operable to move the pipe only between the impacting of the pipe with the stop members.

5. The apparatus according to claim 1, wherein the agitator is operable to move the pipe only during the impacting of the pipe with the stop members.

6. The apparatus according to claim 1, wherein the agitator comprises a movable coil disposed in a magnetic circuit polarized by a permanent magnet, the coil connected to the pipe by a ball and socket connection.

7. The apparatus according to claim 1, wherein the agitator comprises at least one piezoelectric ceramic connected to each stop member, the piezoelectric ceramic having a two-element crystalline structure, one end of each piezoelectric ceramic being connected to the frame, and another end thereof arranged to impart motion to the pipe.

8. The apparatus according to claim 7, wherein there is a plurality of piezoelectric ceramics disposed adjacent each side of the pipe and which are simultaneously actuated as a group.

9. The apparatus according to claim 7, wherein there is a plurality of piezoelectric ceramics disposed adjacent each side of the pipe and which are individually actuated.

10. The apparatus according to claim 7, wherein the stop structure comprises a plurality of stop members disposed adjacent each side of the pipe, there being a piezoelectric ceramic mounted on each stop member, the piezoelectric ceramics being individually actuated.

11. The apparatus according to claim 7, wherein each piezoelectric ceramic is mounted on a side of its respective stop member facing away from the pipe.

12. An apparatus for producing particles from a flowable mass, comprising:
   - a frame;

an extrusion pipe mounted in the frame for conducting the flowable mass and including outlet holes spaced along a longitudinal axis of the pipe, the pipe mounted to swing about an axis extending parallel to the longitudinal axis in spaced relationship thereto;

a stop structure arranged to be engaged by the pipe to define two directional change points for the pipe during its oscillation; and an agitator operably connected to the pipe for oscillating the pipe in a direction transversely of the axis for shearing off the mass flowing through the outlet holes so that the sheared-off mass forms particles; the agitator comprising at least one piezoelectric ceramic connected to each stop member, the piezoelectric ceramic having a two-element crystalline structure, one end of each piezoelectric ceramic being connected to the frame, and another end thereof arranged to impart motion to the pipe.

* * * * *